US009194765B2

(12) United States Patent
Bråthe et al.

(10) Patent No.: US 9,194,765 B2
(45) Date of Patent: Nov. 24, 2015

(54) TORQUE CALIBRATION METHOD

(75) Inventors: Lars Bråthe, Göteborg (SE); Anders Eriksson, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/994,369

(22) PCT Filed: Dec. 15, 2010

(86) PCT No.: PCT/SE2010/000299
§ 371 (c)(1),
(2), (4) Date: Aug. 15, 2013

(87) PCT Pub. No.: WO2012/082019
PCT Pub. Date: Jun. 21, 2012

(65) Prior Publication Data
US 2014/0148993 A1 May 29, 2014

(51) Int. Cl.
*G01M 15/04* (2006.01)
*G01G 19/08* (2006.01)
*G01L 3/24* (2006.01)
*G01L 5/13* (2006.01)

(52) U.S. Cl.
CPC ............. *G01M 15/042* (2013.01); *G01G 19/08* (2013.01); *G01G 19/086* (2013.01); *G01L 3/24* (2013.01); *G01L 5/13* (2013.01)

(58) Field of Classification Search
CPC ..... F16H 59/14; B60W 10/06; G01G 19/086; G01L 5/00
USPC .................................. 701/54; 702/41; 73/865
See application file for complete search history.

(56) References Cited

U.S. PATENT DOCUMENTS

| 4,548,079 | A | 10/1985 | Klatt |
| 4,656,876 | A | 4/1987 | Fremd |
| 6,104,977 | A | * | 8/2000 | Avery, Jr. ...................... 701/101 |
| 6,144,928 | A | 11/2000 | Leimbach et al. |
| 6,185,996 | B1 | 2/2001 | He et al. |
| 6,553,958 | B1 | * | 4/2003 | Kolmanovsky et al. ...... 123/295 |

(Continued)

FOREIGN PATENT DOCUMENTS

WO 9318375 A1 9/1993

OTHER PUBLICATIONS

International Search Report (Aug. 19, 2011) for corresponding International application No. PCT/SE201 0/000299.

(Continued)

*Primary Examiner* — Thomas G Black
*Assistant Examiner* — Ana Thomas
(74) *Attorney, Agent, or Firm* — WRB-IP LLP

(57) ABSTRACT

A method is provided for verifying an engine torque estimation and includes estimating the engine torque based on the amount of fuel injected into the engine, where the engine torque is obtained from a fuel injection table, estimating a first vehicle weight value by a calculation based on acceleration of the vehicle and the estimated engine torque, estimating an auxiliary brake torque by using an auxiliary brake table, estimating a second vehicle weight value by a calculation based on the estimated auxiliary brake torque, and comparing the first vehicle weight value with the second vehicle weight value. The method facilitates detecting if an actual engine torque value deviates from the original engine torque value of a vehicle without measuring the engine torque with a separate torque sensor.

12 Claims, 2 Drawing Sheets

(56) References Cited

U.S. PATENT DOCUMENTS

| | | |
|---|---|---|
| 6,633,006 B1 | 10/2003 | Wolf et al. |
| 7,039,519 B2 * | 5/2006 | Ishiguro et al. ............... 701/124 |
| 2004/0181317 A1 | 9/2004 | Flechtner et al. |
| 2007/0085497 A1 | 4/2007 | Popp et al. |
| 2010/0049415 A1 | 2/2010 | Bauerle |
| 2013/0081883 A1 * | 4/2013 | Yang ................................ 177/1 |

OTHER PUBLICATIONS

International Preliminary Report on Patentability (Mar. 21, 2013) for corresponding International application No. PCT/SE201 0/000299.

* cited by examiner

TORQUE CALIBRATION METHOD

BACKGROUND AND SUMMARY

The present invention relates to a method for verifying a torque estimation of an engine. The inventive method is adapted for engines having an auxiliary brake. Thus, the method is well suited for the use in heavy vehicles.

In modern heavy vehicles, such as trucks, tractors, busses and other commercial vehicles, several systems for estimating and controlling the driving parameters of the engine and of the vehicle are known. These often relates to compensating the driving parameters of the engine and the braking parameters for the brake systems. Depending on the available sensors on the vehicle, some parameters can be measured directly by the sensors, and other parameters must be estimated by using the available measurements.

Some vehicles, e.g. the ones equipped with air suspension, have the capability to measure the weight of the load of the vehicle directly by using the air suspension pressure sensors. The total weight of the vehicle can thus easily be obtained since the unloaded weight of the vehicle is known. Other vehicles, e.g. such that have conventional leaf springs, are usually not provided with sensors that can measure the weight of the load directly. Instead, different ways of obtaining the weight of the vehicle are known.

In one method, an estimate of the weight of a vehicle is calculated from a measured acceleration and an estimated or measured engine torque. The engine torque can be measured by a torque sensor positioned e.g. on the gearbox input shaft. An estimate for the engine torque may be based on the amount of fuel injected into the engine. The amount of injected fuel is input in a fuel injection table which will output an estimate for the engine torque at any given time. In this way, an estimate for the weight of the vehicle or the vehicle combination can be provided.

In order to be able to set weight dependent control parameters of the vehicle, it is important that the estimated weight of the vehicle is as precise as possible. If the estimated weight is lower than the actual weight, the vehicle may be overloaded when an additional load is loaded on the vehicle. It is also possible that the brakes are applied with a too low brake pressure which may lead to a longer brake distance. If the estimated weight is higher than the actual weight, the fuel consumption may be higher than necessary and the vehicle may not be operated as economical as possible. For a vehicle that is not provided with an engine torque sensor, it is thus important that the engine torque is estimated properly.

U.S. Pat. No. 6,144,928 describes a method for determining the weight of a vehicle, in particular for a commercial vehicle having a towing vehicle and a trailer/semitrailer. By the method, it is possible to determine the mass distribution relation between the complete vehicle combination and the towing vehicle alone. This will allow for a proper distribution of the brake torque to individual wheel brakes, and between the towing vehicle and the trailer.

U.S. Pat. No. 6,144,928 describes a method for determining the mass of a vehicle with at least two measurements offset in time within a measuring period, where one measurement is performed during a traction-free phase and the other measurement is performed during a traction phase. One measurement is preferably performed within the traction-free phase during a gearshift and the other during a traction phase before or after the gearshift.

US2010/00049415 describes a method for compensating a vehicle brake value based on the mass of the vehicle.

In these and other methods, the weight of the vehicle is estimated in different ways. There is however still room for improvements.

It is desirable to provide a method for verifying an engine torque estimation. It is also desirable to provide a method for detecting manipulated engine control parameters. It is also desirable to provide a method for detecting a non-approved engine modification. It is also desirable to provide a method for ensuring that the vehicle can be driven safely after a non-approved modification is detected.

In a method for verifying an engine torque estimation, comprising the steps of estimating the engine torque based on the amount of fuel injected into the engine, where the engine torque is obtained from a fuel injection table and estimating a first vehicle weight value by a calculation based on the acceleration of the vehicle and the estimated engine torque, an auxiliary brake torque is estimated by using an auxiliary brake table, a second vehicle weight value is estimated by a calculation based on the estimated auxiliary brake torque, and in that the first vehicle weight value is compared with the second vehicle weight value.

By this first embodiment of the method for verifying an engine torque estimation according to the invention, it is possible to detect if the actual engine torque of a vehicle deviates from the original engine torque of that vehicle. This is done without using a specific separate torque sensor. The advantage of this is that a manipulation of the control parameters for the engine in the engine control system can be detected. Such manipulation can lead to excess wear of the engine, to overload of the engine or engine components and/or to excessive temperatures of the engine or engine components. Further, when the estimated engine torque is used to calculate the weight of the vehicle, the calculated weight ma be erroneous which in turn may affect the weight dependent parameters of the vehicle.

In an advantageous development of the inventive method, the auxiliary brake is an engine brake and the auxiliary brake table uses the engine speed as input. In this way, the engine torque can be obtained in an easy way and there is no need for a retarder or the like.

In an advantageous development of the inventive method, a message is provided which contains the difference between the first vehicle weight value and the second vehicle weight value. In this way, the result can be presented in an easy way. Such a message may be given to the driver of the vehicle or may be sent to a stationary control station. The message may also be stored in a memory for further use. p In an advantageous development of the invention, the first vehicle weight values and the second vehicle weight values are stored in a table within predefined time intervals. In this way, it is possible to obtain a long term history for the vehicle. This makes it possible to detect if a vehicle is driven with manipulated engine parameters at some periods and with the regular engine parameters when maintenance is due. It may also be possible to detect if a different fuel has been used at some time periods.

BRIEF DESCRIPTION OF DRAWINGS

The invention will be described in greater detail in the following, with reference to the attached drawing, in which.

DETAILED DESCRIPTION

Figure 1:
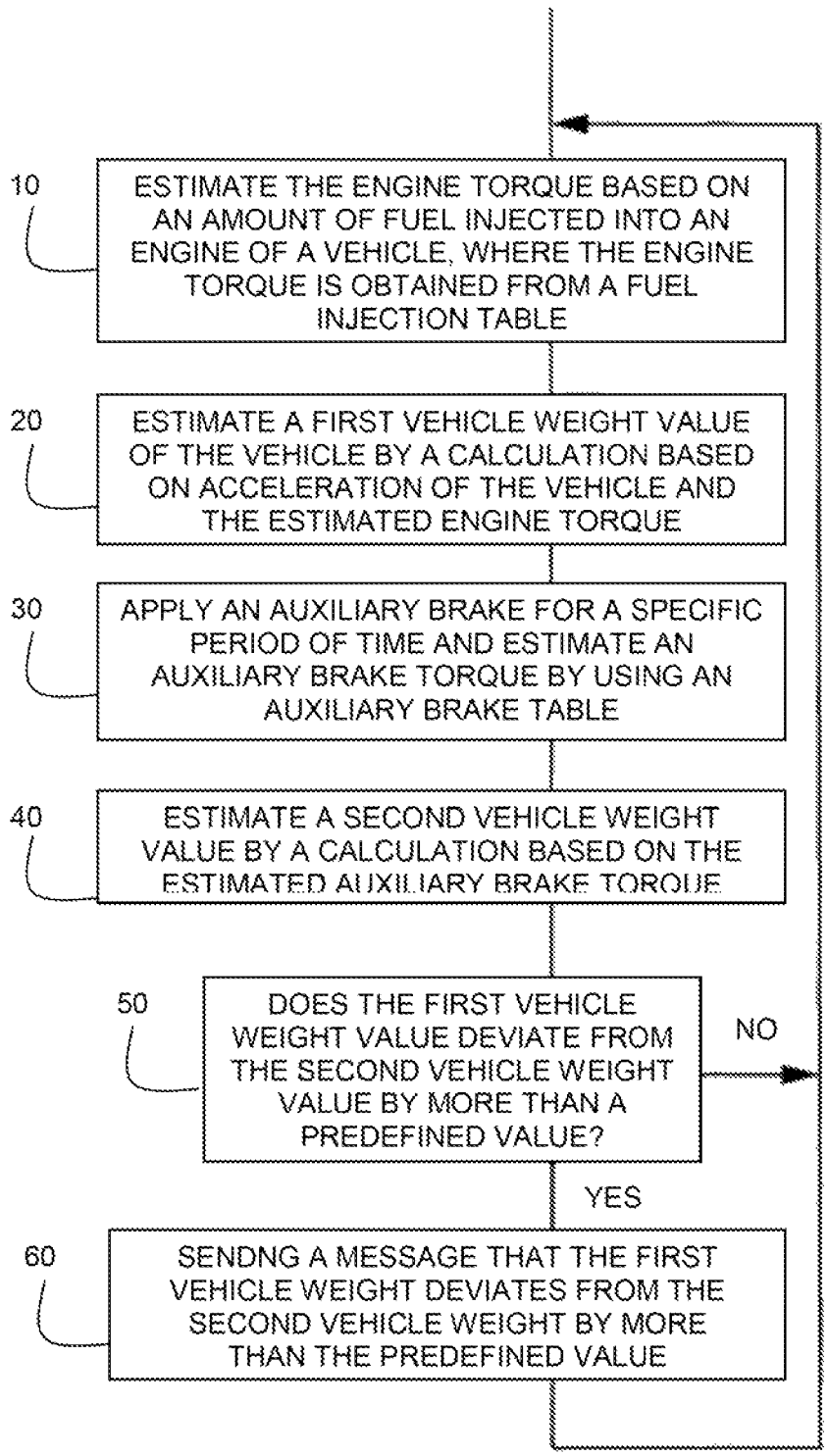
FIG. 1 shows a flow chart of an example of the method according to the invention.

The embodiments of the invention with further developments described in the following are to be regarded only as examples and are in no way to limit the scope of the protection provided by the claims.

In the method described herein, a truck will be used as an example of a vehicle. Other types of heavy vehicles in which the inventive solution may be used are tractors with or without a trailer and busses. It is also possible to use the invention on smaller vehicles, such as distribution lorries and vans, as long as the engine is provided with an engine brake of some sort or that the vehicle is equipped with an auxiliary brake. An engine brake can be e.g. an exhaust brake or a compression brake. An auxiliary brake can be e.g. a hydraulic retarder or an electromagnetic auxiliary brake.

The purpose of the inventive method is to verify that an engine torque estimation performed in a conventional way is correct. Since the weight estimation on vehicles that are not equipped with load sensors is dependent on the engine torque estimation, it is important that the engine torque estimation is correct in order to be able to set weight dependent parameters of the vehicle to correct values. There are different reasons for the engine torque estimation to deviate from the actual engine torque. One obvious reason is that the parameters of the control electronics or the hardware of the engine is modified in a non-approved way. Such a modification may e.g. be a replaced injection pump, a replaced inlet compressor or modified engine control parameters, so called chip tuning. A modification of the control parameters may take place in the engine control computer or may be a unit mounted after the engine control computer. It is also possible to manipulate one or more sensors sending signals to the engine control computer in order to modify the control parameters. If these modifications are made by an external party and if the modifications are not approved by the manufacturer of the vehicle, the modifications may not be detected by the vehicle control system. The engine may thus deliver a higher engine torque than the original nominal engine torque at a given fuel injection set reference value. Another reason for the engine torque to differ is if a non-approved fuel is used.

A conventional engine torque estimation is done by reading the set reference value for the fuel injection or measure the amount of injected fuel at a given engine rotational speed. This reference value or measured value is used as input to a stored fuel injection table which gives an engine torque value as output. This engine torque value assumes a specific fuel quality. Since the engine torque is not measured directly, it is important that the engine behaviour can be predicted by using the fuel injection reference value.

The weight of the vehicle is calculated by using the estimated engine torque value together with a measured acceleration for a given time period. A simplified equation for this is force equals mass times acceleration. In this equation, farther parameters can of course be included to obtain a higher accuracy, i.e. driveline efficiency, slope resistance, rolling resistance and/or wind resistance. The use of such additional parameters may be dependent on available sensors for that parameter. The slope resistance may e.g. be measured by an inclination sensor or the road profile may be obtained from a GPS based map system. The obtained vehicle weight value can be used to set different weight dependent vehicle parameters, such as braking parameters, and may also be used to deduct the total load on the vehicle. This can in turn be used for loading purposes in order to keep specific weight limitations.

If the engine torque value is not correct, the estimated vehicle eight will also not be correct. If the engine is manipulated with the purpose of giving a higher engine torque than the nominal engine torque, the estimated vehicle weight will be lower than the actual vehicle weight. Weight dependent parameters, such as brake parameters, may thus be affected such that the brake distance may be longer than necessary. It may also mislead a driver to overload the vehicle. A further disadvantage of manipulated engine parameters is that the engine may be driven harder than intended at a given situation. This may lead to an overloaded engine, excessive high temperatures in the engine and an overloaded driveline. This may affect the life of the vehicle in a negative way with higher maintenance costs for the owner and/or higher warranty costs for the manufacturer.

In the inventive method, an additional vehicle weight estimation based on an auxiliary brake torque estimation is thus performed. The brake torque of an auxiliary brake is simple to determine. For an auxiliary brake mounted outside of the engine, the brake torque can be obtained from the rotational speed where the brake is mounted, e.g. by the rotational speed of the drive shaft when the brake is mounted after the gear box. For an engine brake, the brake torque is mainly dependent on the engine speed and can thus be easily obtained. The actual brake torque of the auxiliary brake is also dependent on the requested brake pressure. An auxiliary brake, e.g. a retarder, may have a number of fixed brake levels. In this case, each brake level will have a specific brake torque table relating to the rotational speed. If the requested brake torque is variable, the table will comprise a function relating the requested brake torque to the rotational speed.

Thus, the brake torque can be estimated in a reliable way without it being affected by a manipulated fuel injection. The engine speed or the rotational speed of the auxiliary brake 133 (FIG. 2) together with the requested brake level is input, to a stored auxiliary brake table 123 which outputs the brake torque. The estimated weight is calculated from the brake torque in a similar way as the estimated engine torque as described above, by using the deceleration of the vehicle during a specific time period.

When measuring the deceleration of the vehicle, it is important that only the auxiliary brake is used during this measurement and not any wheel brakes. On several occasions, when the vehicle is coasting, this can be achieved without affecting the performance of the vehicle and without the attention of the driver. In practice, this is done such that when a smaller brake torque is requested by the driver, e.g. when the driver pushes slightly on the brake pedal and the system detects that the required brake torque can be delivered by using only the auxiliary brake, an estimation is performed at the same time. An estimation can also be performed when a cruise control is used b the driver to hold a specific cruising speed.

The vehicle weight value resulting from the brake torque estimation can then be compared with the vehicle weight value resulting from the engine torque estimation. If the two vehicle weight values differ from each other by at least a predefined factor, it can be assumed that the engine is running under a non-approved condition. This may e.g. include manipulated control parameters for the engine, replaced engine components or a non-approved fuel. Specifically, if the vehicle weight value resulting from the brake torque estimation is higher than the vehicle weight value resulting from the engine torque estimation by a predefined factor, is can be assumed that the engine control parameters have been manipulated. The predefined factor used is dependent on different environmental and vehicle parameters, but should be higher than the tolerances for both the engine torque estimation and the brake torque estimation. A factor deviating more than 3% is plausible.

Since the vehicle weight values may vary some depending on environmental conditions, the vehicle weight values resulting from the engine torque estimation and the vehicle weight value resulting from the brake torque estimation can be stored in a table. These values can be used to obtain an average vehicle weight value and can also be used to obtain a long term trend for the vehicle weight values and the deviation between the vehicle weight values. In this way, it is possible to see deviations over time, which may e.g. show when a different fuel was used or when an engine parameter manipulation was performed.

Figure 2:
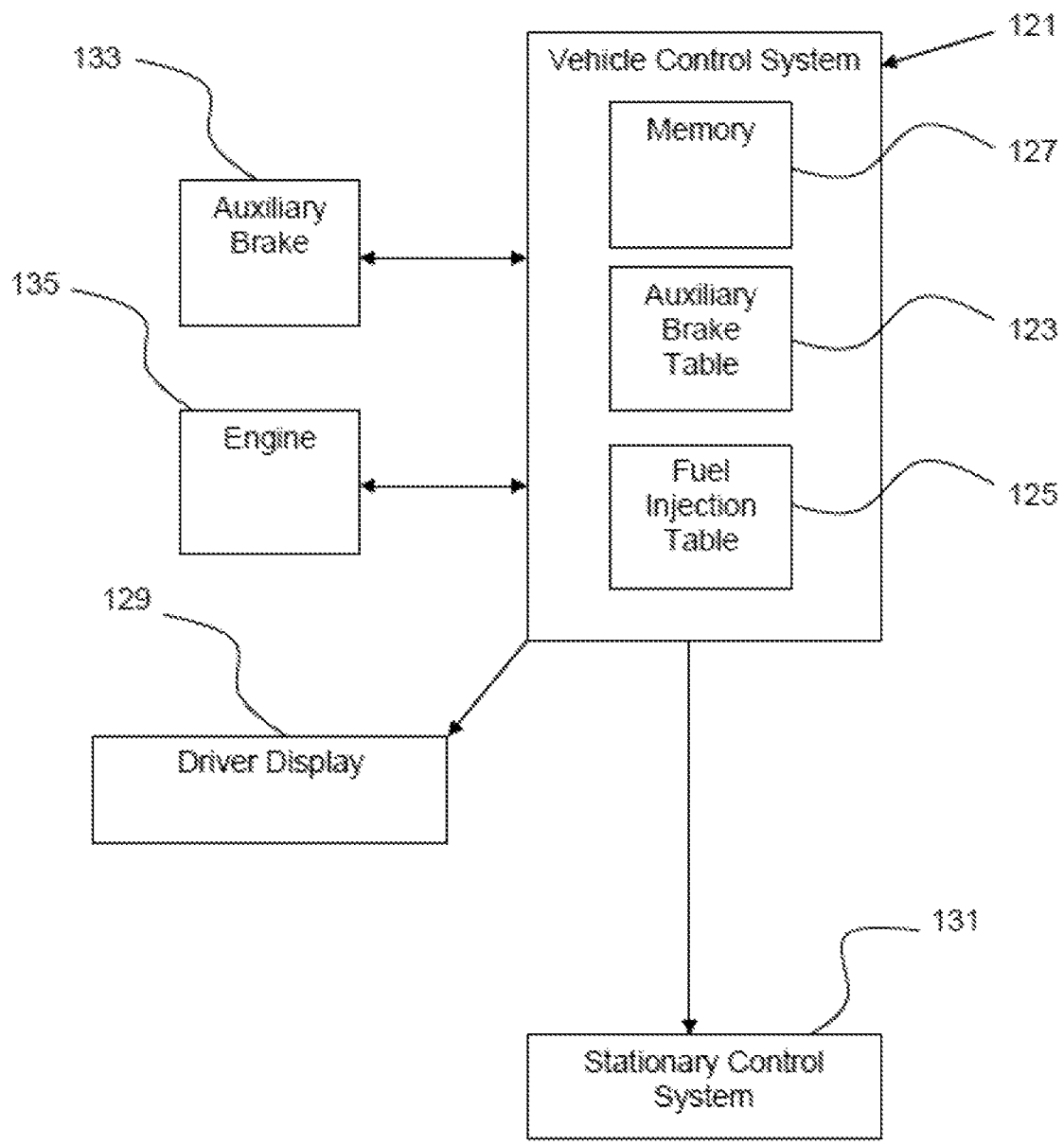
FIG. 2 is a schematic view of equipment for performing a method according to an aspect of the present invention.

If there is a deviation between the vehicle weight value resulting from the engine torque estimation and the vehicle weight value resulting from the brake torque estimation, a message can be provided by the vehicle control system 121 as seen in FIG. 2, The message can be stored in a memory 127 and can be read during maintenance, A message can also be given to the driver, e.g. on a display 129 or by a dedicated lamp or the like. It is also possible to send the message to a central stationary control station 131, either at the maintenance centre or at the manufacturer, such that the message can be stored in the history for a specific vehicle.

It is further possible that the vehicle control system 121 reduces the output power of the engine 135 by a value based on the vehicle weight value resulting from the brake torque estimation. In this way, the stored fuel injection table 125 is adapted to a reversed calculated engine torque value obtained from the vehicle weight value resulting from the brake torque estimation. This will allow the vehicle to be used in a safe way without the risk of overloading the engine. It is also possible to reduce the output power of the engine 135 by a larger amount, in order to ensure that there will be no overload of the engine or the vehicle until the cause of the problem is found and corrected. Such a solution may be to reprogram the engine control system may with the proper software.

FIG. 1 shows a flow chart of an example of the inventive method. In step 10, the engine torque is estimated by using the amount of fuel injected into the engine as input to a fuel injection table and from that table, an engine torque value is outputted.

In step 20, a first vehicle weight value is calculated based on the acceleration of the vehicle and the estimated engine torque value obtained in step 10.

In step 30, the engine brake torque is estimated by using the engine speed as input to a brake torque table which gives an engine brake torque value as output.

In step 40, a second vehicle weight value is calculated based on the engine brake torque and the deceleration of the vehicle.

In step 50, the first vehicle weight value is compared with the second vehicle weight value.

In step 60, a message is provided if the difference between the first vehicle weight value and the second vehicle weight value differs with more than a predefined value. The message may be stored in a memory, it may be given to the driver or it may be sent to a stationary control station. When a message has been provided, the system may continue with a new estimation, preferably after a specific time interval.

If the difference between the two vehicle weight values is below the predefined value, no message is created and the method may continue with a new estimation, preferably after a specific time interval.

The invention is not to be regarded as being limited to the embodiments described above, a number of additional variants and modifications being possible within the scope of the subsequent patent claims.

The invention claimed is:

1. A method for verifying an engine torque estimation, comprising:
   estimating the engine torque based on an amount of fuel injected into an engine of a vehicle, where the engine torque is obtained from a fuel injection table,
   estimating a first vehicle weight value of the vehicle by a calculation based on acceleration of the vehicle and the estimated engine torque,
   applying an auxiliary brake for a specific period of time and estimating an auxiliary brake torque by using an auxiliary brake table,
   estimating a second vehicle weight value by a calculation based on the estimated auxiliary brake torque,
   comparing the first vehicle weight value with the second vehicle weight value, and
   verifying the estimated engine torque if the first vehicle weight does not deviate from the second vehicle weight by more than a predefined value.

2. The method according to claim 1, wherein the auxiliary brake is an engine brake, the method comprising estimating the auxiliary brake torque using the auxiliary brake table using engine speed as input.

3. The method according, to claim 1, wherein the auxiliary brake is an external retarder, the method comprising estimating the auxiliary brake torque using the auxiliary brake table using the rotational speed of the auxiliary brake as input.

4. The method according to claim 1, comprising providing a message containing a difference between the first vehicle weight value and the second vehicle weight value.

5. The method according to claim 4, comprising sending the message to a stationary control station.

6. The method according to claim 4, comprising giving the message to a driver of the vehicle by an optical and/or an audio signal.

7. The method according to claim 1, comprising providing a message if the first vehicle weight value differs from the second vehicle weight value by at least a predefined value.

8. The method according to claim 7, wherein the predefined value is larger than 3%.

9. The method according to claim 1, comprising providing a message when the second vehicle weight value is larger than the first vehicle weight value by a predefined value.

10. The method according claim 1 wherein the first vehicle weight value and the second vehicle weight value are stored in a table at predefined time intervals.

11. The method according to claim 10, wherein the first vehicle weight value and the second vehicle weight value are stored in a table at predefined time intervals when a difference between the first vehicle weight value and the second vehicle weight value is above a predefined value.

12. The method according to any of claim 1, comprising decreasing power output of the engine if a difference between the first vehicle weight value and the second vehicle weight value is above a predefined value.

* * * * *